United States Patent [19]

Ratcliff

[11] 3,894,748

[45] July 15, 1975

[54] LAWN AND GARDEN CART

[76] Inventor: James E. Ratcliff, 1618 Prichard, Dallas, Tex. 75217

[22] Filed: Nov. 1, 1973

[21] Appl. No.: 411,792

[52] U.S. Cl. .................................. 280/41; 280/47.35

[51] Int. Cl. .................................................. B62b 3/02

[58] Field of Search ............. 280/47.35, 36 R, 79.1, 280/41; 248/98; 211/60 T, 178 R

[56] References Cited

UNITED STATES PATENTS 2,141,881 12/1938 Schray ......................... 280/47.35 X

*Primary Examiner*—David Schonberg

*Assistant Examiner*—Michael J. Forman

[57] ABSTRACT

A cart for transporting and storing garden implements having extended thin handles and head portions, such as hoes, rakes, shovels, and the like along with providing a carrier for containers of the type used for leaf and grass cuttings, all of such containers and implements being readily available on the cart with the cart provided with wheels for the easy rolling of the cart about the supporting surface from point to point for utilization, the cart being readily folded in a compact manner for storage and shipping purposes.

6 Claims, 6 Drawing Figures

LAWN AND GARDEN CART

BACKGROUND OF THE INVENTION

1. Field of the Invention

This invention relates generally to carts and more particularly to a novel and improved lawn and garden cart intended for the transporting and storing of garden implements such as the type having long handles such as shovels, hoes and the like, and also includes a container carrying portion for containers of the type normally used for holding leaves and grass cuttings.

2. Description of the Prior Art

In the proper maintaining of a lawn about a home, either by an individual homeowner or by professional lawn maintenance workers, a great number of different tools are required which must normally be manually transported from point to point about the lawn as being used, it normally being that a particular tool required at a particular time is not readily available without having to walk a substantial distance to obtain the same so that the worker will do without the proper tool and attempt to use the tool at hand for the purpose, and while such tool might accomplish such purpose, it obviously takes longer and requires more labor than if the proper tool were utilized. Further, when working on the lawn it is normally required that the worker haul around a container for the depositing therein of leaves, grass cuttings, clippings, and the like normally collected during the operation of working on the lawn.

Further, as most homeowners must perform work on their respective lawns over an extended period of time with frequent interruptions, such as when returning from work in the evening or at brief intervals during the week, much of this time being utilized to obtain and replace landscaping and garden implements from a suitable storage area, such as the garage or basement of the home, to the place where they are needed on the lawn, and then restoring the tools to the storage area each time work is stopped. This process of transporting tools back and forth is time consuming and laborious, along with the fact that most likely only a few tools are transported at any one time so that normally all the tools required to properly do the job are not always readily available to the worker where the work is being performed.

SUMMARY OF THE INVENTION

The present invention recognizes the plight of homeowners and lawn maintenace workers when working on a lawn and provides a novel solution thereto which overcomes all of the prior deficiencies and disadvantages encountered by such workers.

The present invention provides novel lawn and garden cart supported on wheels and having a rack adapted to store garden implements having long handles in a convenient manner along with providing a bracket for holding a bag or other container for depositing of leaves, grass clippings and the like thereinto, the cart being readily moveable from point to point about the lawn such that all tools are readily available to the worker.

It is a feature of the present invention to provide a lawn and garden cart which is highly mobile and has provisions thereon for supporting garden implements and tools in an organized and readily accessible manner.

A further feature of the present invention provides a lawn and garden cart having provisions for supporting and transporting a plastic bag or other suitable container for the depositing of leaves, grass cuttings, clippings and the like thereinto during the landscaping procedure.

Still a further feature of the present invention provides a lawn and garden cart which is readily foldable to a compact size for ease of storage and shipping purposes.

Yet still a further feature of the present invention provides a lawn and garden cart which is relatively simple in its construction and which therefore may be readily manufactured at a relatively low cost and by simple manufacturing methods.

The provision of a lawn and garden cart, such as briefly outlined above, and possessing the stated advantages, constitutes the principal features of the present invention. The provision of a lawn and garden cart which is relatively devoid of moving parts and which therefore is unlikely to get out of order; one which is rugged and durable and which therefore may be guaranteed by the manufacturer to withstand the intended usage; one which is aesthetically pleasing and refined in appearance; one which may be readily manufactured from readily available parts and components; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENT

Figures 1, 2, 3, 4, 5, 6:
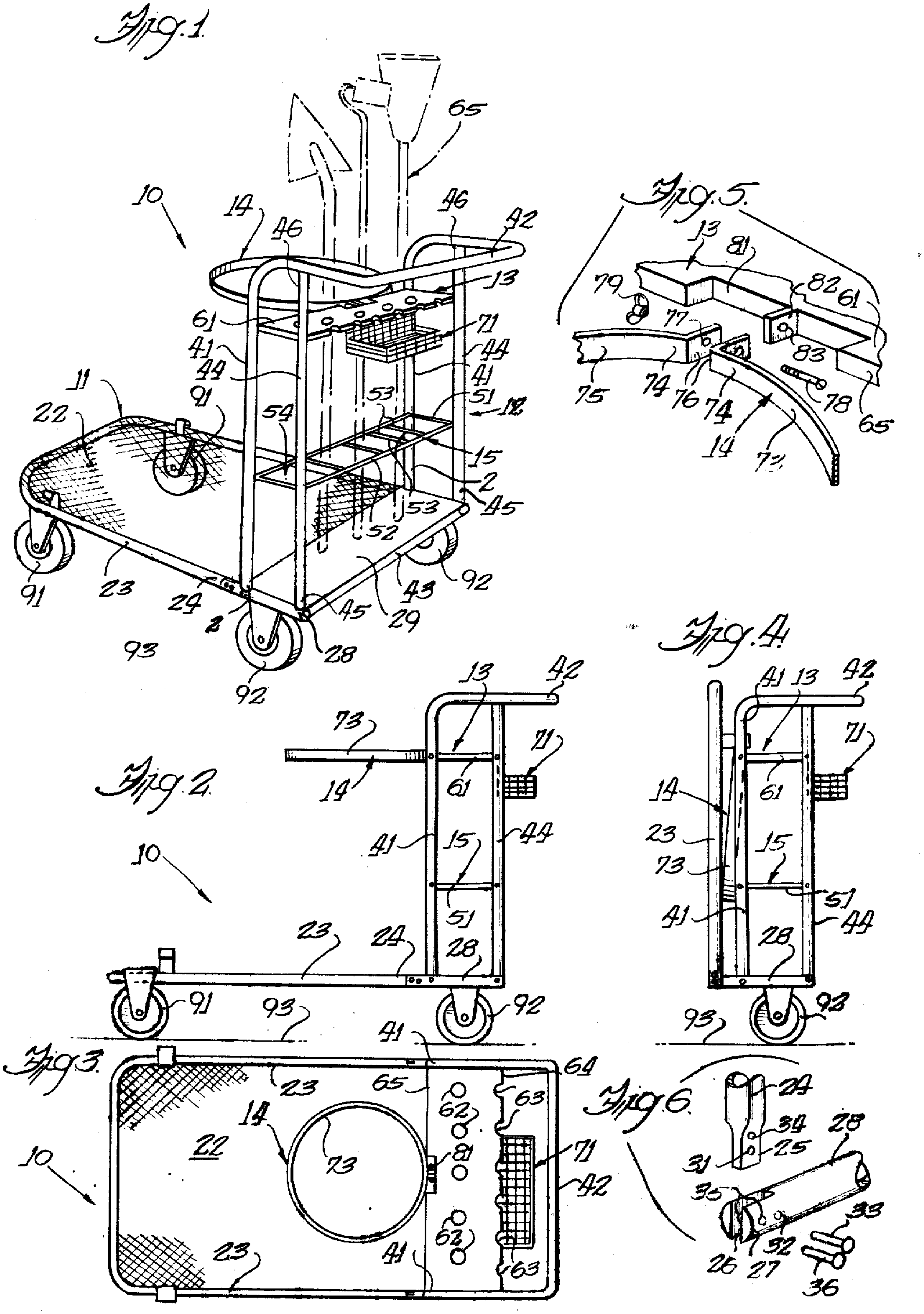
FIG. 1 is a perspective view of a lawn and garden cart constructed in accordance with the principles of the present invention.
FIG. 2 is a side elevational view of the cart.
FIG. 3 is a top plan view of the cart.
FIG. 4 is a side elevational of the cart in the folded condition.
FIG. 5 is an enlarged fragmentary perspective view of the connection between the cart frame and the circular bag holding bracket.
FIG. 6 is an enlarged fragmentary exploded perspective view of the connection between the cart base and the cart frame.

Referring now to the drawings in detail there is illustrated a preferred form of a lawn and garden cart constructed in accordance with the principles of the present invention and designated in its entirety by the reference numeral 10 and which is comprised generally of a horizontally extending base section 11, a vertically extending handle section 12, an implement holding rack 13, and a circular bag holding bracket 14.

The base section 11 is formed of a wire mesh platform 22 of an elongated rectangular configuration having the peripheral edges thereof fixedly attached to a U-shaped tubular frame 23 having the end portions 24 flattened to define rectangularly elongated terminal ends 25 of a size and configuration adapted to be freely received in an associated rectangular slot 26 formed in the forward end 27 of each of a pair of longitudinally extending transversely spaced apart elongated cylindrical base members 28 having a solid transversely extending base platform 29 extending therebetween and mounted thereto. Each terminal end 25 is provided with a transversely extending opening 31 extending therethrough and which is adapted to be placed in axial alignment with an opening 32 transversely extending through each associated end 27, a pivot pin fastener 33 axially inserted through the aligned openings to pivotally secure the frame 23 to the base frame 29 in a manner permitting vertical swinging movement of the frame about the base platform. To secure the frame 23 in the horizontal position a second opening 34 is provided in each end 25 with an associated second opening 35 formed in each end 27 with a pin 36 adapted to be removably inserted into the aligned openings 34 and 35 when the frame is in the horizontal position in order to retain the frame in such position, removal of the pins 36 permitting the pivotal movement of the frame for purposes of storage, shipping and the like.

The handle section 12 comprises a pair of vertical upright members 41 having the bottom ends 2 fixedly mounted to the front end portions of horizontal members 28 with the top ends being bent into a horizontal position projecting rearwardly of the cart and joined integrally with a horizontal transversely extending handle 42 which projects rearwardly of the cart a distance greater than the rearward edge 43 of the base platform 29. To assist in rigidly supporting the handle member there is provided a pair of transversely spaced aligned vertical uprights 44 each having their bottom ends 45 attached to the back end portions of horizontal members 28 with their respective top end portions 46 fixedly attached to the horizontally extending portions of each of the uprights 41.

A wire frame rack 15 is spaced vertically above the top surface of the base platform 29 and extends horizontally between the pairs of uprights 41 and 44, the rack frame consisting of a pair of longitudinally extending end members 51 which are interconnected at their end portions by a pair of spaced apart transversely extending side members 52, there being a plurality of spaced apart longitudinally extending cross members 53 joined between the side members and dividing the rack into a plurality of compartments 54.

The implement holding rack 13 is formed of an elongated substantially flat sheet of material extending in a horizontal position transversely between the respective pairs of uprights 41 and 44 and designated by reference numeral 61, the rack having a plurality of transversely spaced apart openings 62 extending vertically therethrough along with a plurality of semi-circular notches 63 extending therethrough and spaced transversely along the back edge 64 of the rack. The size and configuration of the openings 62 and notches 63 being an amount sufficient to afford free entry therethrough of the elongated handles of tools and implements, such as designated by the tools 65 in FIG. 1, the handles of such tools extending through the openings and notches and through the compartments 54 of the rack frame 15 to rest on the top surface of the base frame 29.

For carrying small tools, parts and the like there is provided a wire mesh box-like basket 71 which is fastened to the rack 13 centrally thereof in any convenient manner, such as by bolts, screws or the like.

The bag holding bracket 14 is formed of a circular split ring 73 having the respective end portions 74 disposed in confronting relationship and including radially outwardly flanged portions 76 each provided with an opening 77 extending transversely therethrough and adapted to receive a bolt 79 axially therethrough with the threaded end of the bolt secured thereto by a finger tightening fastening means, such as wing nut 79. To secure the bag holding bracket 14 to the cart there is provided in the forward edge 65 of sheet 61 a recess 81 having a longitudinally extending projection 82 of a rectangular cross-section projecting forwardly thereof and having an opening 83 therein and extending therethrough, the flanges 76 adapted to be disposed on either side of projection 82 in a manner to encapsulate the projection therebetween with the opening 77 in axial alignment with opening 83, after which bolt 78 passes through the aligned openings to retain the bracket 14 to the rack 13. The bracket 14 is moveable between an operative horizontal position adapted to receive a plastic bag type container therein which would project downwardly therefrom to rest on platform 22 so that grass clippings, leaves, cuttings and the like may be readily deposited into such bag for later disposition, with the bracket being swingable downwardly about the bolt 78 in a vertical plane to lie substantially adjacent the uprights 41 for purposes of storage, shipping and the like of the cart 10.

To provide ease of transportation of the cart from point to point during use thereof, the frame 23 is provided with a pair of stationary caster type wheels 91 at the forward end portion thereof with the base frame 29 and members 28 being provided with a pair of spaced apart swivel caster wheels 92 adapted to swivel about a vertical axis for ease in the steering of the cart along a surface such as the ground 93.

In use, the cart is opened from the storage position, such as illustrated in FIG. 4, to place the frame 23 and bracket 14 in horizontal operative positions, after which the desired tools 65 are inserted through openings 62 and notches 63, such tool handles passing through compartment 54 to rest on the top surface of base frame 29, with any desired tools or implements being rested in basket 71 and with a leaf and grass containing type bag being inserted into the bracket 14 with the bottom thereof resting on platform 22. The cart is now ready for use in transporting all of such tools in a readily accessible manner from point to point between an area of storage and an area of usage on the lawn, with any interruption of the lawn work requiring only that the cart be moved back to the storage area with all of the tools and accessories being readily available for further use without having to remove the tools from the cart to their respective storage positions. Thus, all tools and implements are readily available without having to carry the same about so that the correct implement or tool is always readily available to perform its intended function on the lawn as used by the homeowner, professional lawn caretaker, and the like.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A cart intended for the transporting and storing of garden implements and a container for leaves and grass clippings and the like comprising a base having a front section and a back section, the base front section formed of a longitudinally elongated U-shaped tubular frame having the end portions of said front section pivotally connected to the front edge of the frame back section, a mesh platform extending between said U-shaped frame, the frame back section being formed of a substantially flat transversely extending sheet of material having the end portions the frame back section formed of tubular members in substantial axial alignment with the ends of the front section frame, a plurality of wheels for supporting the base for rolling movement on a surface, a pair of transversely spaced elongated tubular members each having one end thereof secured to the front end corner portions of the back base section and projecting vertically upwardly from said back base section with the top portions of said elongated tubular members being bent approximately 90° to extend in parallel horizontal positions rearwardly of the back frame section to terminate in a transversely extending horizontal bar defining a handle, a second pair of elongated tubular members having their bottom end portions connected to the back corner portion of the back frame section and projecting vertically upwardly from said back frame section.in alignment with the respective associated one of the pair of first mentioned tubular members and terminating at the top ends thereof with the horizontal bent portion of the associated first mentioned tubular member, a substantially flat rectangularly elongated implement holding rack disposed in a horizontal position transversely extending between the spaced apart pairs of first and second mentioned tubular members and spaced vertically upwardly from and in a position vertically disposed over said back frame section, the rack having a front edge and a back edge, a series of transversely spaced apart aligned openings disposed in the rack and extending vertically through said rack of a size to afford free entry of elongated handle members of tools and implements through said openings, a series of semi-circular notches extending transversely along the back edge of the rack and adapted to receive the elongated handle portions of tools and implements through said notches, a rack frame disposed horizontally intermediate the rack and the top surface of the back frame section and extending transversely between the opposed pairs of said first and second mentioned tubular members, the rack frame being of an open construction separated into a series of transversely disposed compartments by a plurality of longitudinally extending rod like members interconnecting the opposed front and back sides of the rack frame, a circular bracket of a substantial diameter adapted to hold a container therein, the bracket being pivotally connected at one end to the front edge of the rack and adapted for movement about the pivot point between a horizontal operative position and a substantially vertical inoperative position.

2. The cart as set forth in claim 1 wherein the opposed ends of the front base section disposed adjacent the front edges of the back base section are pivotally attached to said back base section, the pivot connection comprising a vertical flattened rectangular area at the end of each of the tubular members forming the U-shaped front base section, a pair of longitudinally aligned spaced apart openings disposed in side-by-side relationship in each flattened portion and extending completely through each said flattened portion, a vertical slot extending into the front end of each opposed end of the back base section and being of a size and configuration to freely receive the associated flattened front base section end within said slot, a pair of longitudinally aligned spaced apart openings extending transversely through the slotted front end in side-by-side relationship and spaced apart a distance equal to the spacing between the openings in the flattened end portion, each flattened end portion received within each associated slot with each pair of openings.in axial alignment with the associated pair of openings in the slot, a pivot pin axially inserted through one set of aligned openings between each slot and flattened end portion and fixedly secured in position, and a locking pin adapted to be detachably inserted into the remaining set of aligned openings between each slot and flattened end to lock the front base section in a horizontal position substantially aligned with the horizontal back base section when the cart is in the operative position, and said locking pin adapted to be removed from such aligned set of openings to permit the front base section to pivot upwardly in a swinging movement about the pivot pin to a substantially vertical position for purposes of storage and shipping of the cart in a compact and convenient manner.

3. The cart as set forth in claim 2 wherein the circular bracket comprises an integrally formed rim having the end portions disposed in confronting relationship, each end portion formed with a radially outwardly extending flange portion, an opening extending transversely through each flange portion, the openings being disposed in axial alignment, a rectangularly shaped member projecting longitudinally from the implement holding rack, an aperture extending transversely through the projecting member, the bracket flanges adapted to be disposed on opposite sides of the projecting member with the openings in axial alignment with the aperture, a bolt axially inserted through the aligned openings and aperture and secured to the bracket flanges and the projecting member by a nut threadedly fastened on the opposite end of said bolt, the nut adapted to be tightened and loosened on the bolt by finger pressure of an individual's hand without requiring tools and the like, the bracket being swingable in a vertical plane about the bolt between the operative and inoperative positions.

4. The cart as set forth in claim 3 further comprising an elongated rectangular recess formed centrally in the front edge of the implement holding rack, the projecting member adapted to secure the bracket to the cart being disposed centrally of the back surface of the recess and projecting forwardly of said recess a distance approximately equal to the front edge surface of the rack.

5. The cart as set forth in claim 4 further comprising a wire mesh basket fixedly mounted to the implement holding rack approximately centrally and extending beneath the bottom surface of said rack and adapted to hold smaller tools and parts within said basket.

6. The cart as set forth in claim 5 wherein the plurality of wheels comprise a first pair of caster wheels fixedly mounted at transversely spaced apart positions on the frame of the front base section, and a second pair of caster wheels swivelly mounted at transversely spaced apart locations on the opposed ends of the back base section and adapted for swiveling movement about a vertical mounting axis to provide for ease of steering of the cart from point to point of usage.

* * * * *